(12) United States Patent
Nemawarkar et al.

(10) Patent No.: US 10,572,180 B1
(45) Date of Patent: Feb. 25, 2020

(54) METHOD AND APPARATUS TO PERFORM A FUNCTION LEVEL RESET IN A MEMORY CONTROLLER

(71) Applicant: Seagate Technology LLC, Cupertino, CA (US)

(72) Inventors: Shashank Nemawarkar, Austin, TX (US); Balakrishnan Sundararaman, Austin, TX (US); Chris Randall Stone, Elgin, TX (US); Charles Edward Peet, Austin, TX (US); Allen Vestal, Copperas Cove, TX (US); Siddharth Krishna Kumar, Austin, TX (US)

(73) Assignee: Seagate Technology LLC, Cupertino, CA (US)

( * ) Notice: Subject to any disclaimer, the term of this patent is extended or adjusted under 35 U.S.C. 154(b) by 75 days.

(21) Appl. No.: 15/141,807

(22) Filed: Apr. 28, 2016

Related U.S. Application Data

(63) Continuation-in-part of application No. 14/936,573, filed on Nov. 9, 2015, now Pat. No. 9,996,262, and a continuation-in-part of application No. 15/141,744, filed on Apr. 28, 2016, now Pat. No. 10,282,103.

(51) Int. Cl.
*G06F 3/06* (2006.01)
(52) U.S. Cl.
CPC .......... *G06F 3/0652* (2013.01); *G06F 3/0604* (2013.01); *G06F 3/0659* (2013.01); *G06F 3/0679* (2013.01)
(58) Field of Classification Search
CPC ..... G06F 3/0652; G06F 3/0604; G06F 3/0659
See application file for complete search history.

(56) References Cited

U.S. PATENT DOCUMENTS

| | | | |
|---|---|---|---|
| 7,836,269 B2 | 11/2010 | Obereiner et al. | |
| 9,052,835 B1 | 6/2015 | Darrington et al. | |
| 9,122,401 B2 | 9/2015 | Zaltsman et al. | |
| 2004/0264284 A1 | 12/2004 | Priborsky et al. | |
| 2006/0149940 A1 | 7/2006 | Mukherjee | |
| 2007/0240018 A1 | 10/2007 | Nalawadi et al. | |
| 2009/0113430 A1* | 4/2009 | Riley | G06F 9/468 718/101 |
| 2009/0327638 A1 | 12/2009 | Buch | |
| 2010/0262738 A1* | 10/2010 | Swing | G06F 3/0613 710/260 |

(Continued)

*Primary Examiner* — Tim T Vo
*Assistant Examiner* — Harry Z Wang
(74) *Attorney, Agent, or Firm* — Setter Roche LLP; Christian W. Best

(57) ABSTRACT

Systems and methods are disclosed to perform a function level reset in a memory controller, in accordance with certain embodiments of the present disclosure. In some embodiments, an apparatus may comprise a storage controller circuit configured to receive a function reset indicator from a host device, the function reset indicator identifying a selected storage controller function executing at a storage controller of the apparatus. The circuit may abort each command associated with the selected function and pending at the apparatus based on the function reset indicator, verify that no commands associated with the selected function remain pending at the apparatus, and clear registers associated with the selected function based on the determination that no commands associated with the selected function remain.

19 Claims, 7 Drawing Sheets

(56) References Cited

U.S. PATENT DOCUMENTS

| | | | |
|---|---|---|---|
| 2011/0179414 A1* | 7/2011 | Goggin | G06F 3/061 |
| | | | 718/1 |
| 2012/0246435 A1 | 9/2012 | Meir et al. | |
| 2013/0067143 A1* | 3/2013 | Hasegawa | G06F 3/0611 |
| | | | 711/103 |
| 2014/0331001 A1* | 11/2014 | Liu | G06F 3/0659 |
| | | | 711/103 |
| 2015/0234601 A1 | 8/2015 | Tsai et al. | |
| 2016/0098365 A1* | 4/2016 | Bshara | G06F 13/105 |
| | | | 710/104 |

* cited by examiner

METHOD AND APPARATUS TO PERFORM A FUNCTION LEVEL RESET IN A MEMORY CONTROLLER

CROSS-REFERENCE TO RELATED APPLICATION

The present application is a continuation-in-part of and claims priority to: pending U.S. patent application Ser. No. 14/936,573, filed Nov. 9, 2015, entitled "Method and Apparatus to Abort a Command"; and pending U.S. patent application Ser. No. 15/141,744, filed Apr. 28, 2016, entitled "Method and Apparatus to Delete a Command Queue", the contents of which are hereby incorporated by reference in their entirety.

SUMMARY

In certain embodiments, an apparatus may comprise a circuit configured to receive a function reset indicator from a host device, the function reset indicator identifying a selected function executing at a storage controller of the apparatus. The circuit may abort each command associated with the selected function and pending at the apparatus based on the function reset indicator, verify that no commands associated with the selected function remain pending at the apparatus, and clear registers associated with the selected function based on the determination that no commands associated with the selected function remain.

In certain embodiments, an apparatus may comprise a storage controller circuit configured to receive a function reset indicator from a host device, the function reset indicator identifying a selected function executing at a storage controller of the apparatus. The storage controller circuit may abort each command associated with the selected function and pending at the apparatus based on the function reset indicator, and reset registers associated with the selected function when no commands associated with the selected function remain.

In certain embodiments, a method may comprise receiving a function level reset (FLR) indicator from a host device at a controller circuit of a data storage device, the FLR indicator identifying a selected function to reset from a plurality of storage controller functions of the data storage device. The method may comprise aborting each command associated with the selected function and pending at the data storage device based on the FLR indicator, and clearing stored values associated with the selected function when no commands associated with the selected function remain pending at the data storage device.

DETAILED DESCRIPTION

In the following detailed description of certain embodiments, reference is made to the accompanying drawings which form a part hereof, and in which are shown by way of illustration of example embodiments. Features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods and functions described herein may be implemented as a device, such as a computer usable medium having computer readable program code means embodied therein or a memory device storing program code or firmware, that includes instructions that when executed, cause a processor device to perform the methods.

Figure 1:
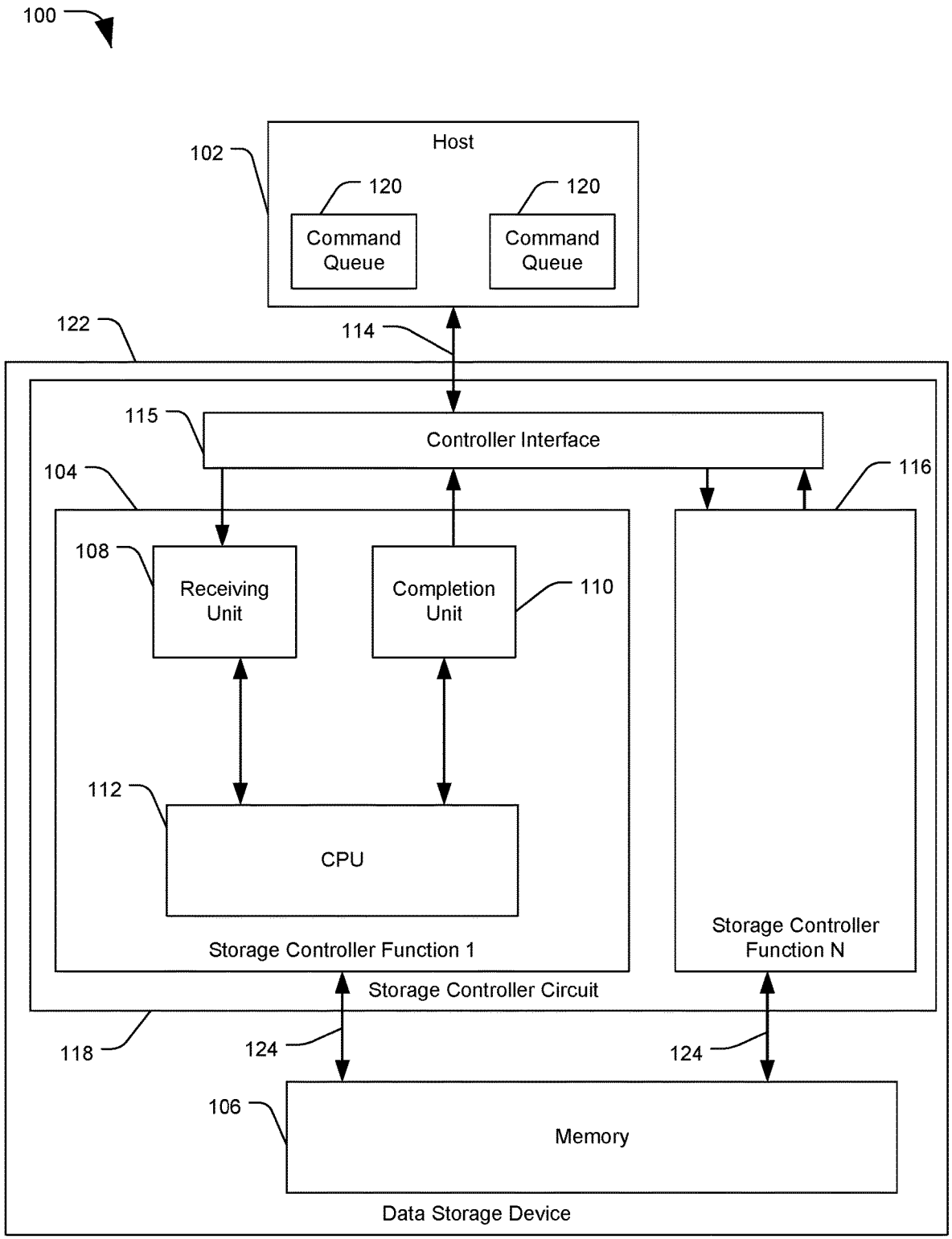
FIG. 1 is a diagram of a system configured to perform a function level reset in a memory controller, in accordance with certain embodiments of the present disclosure.

FIG. 1 is a diagram of a system 100 configured to perform a function level reset in a memory controller, in accordance with certain embodiments of the present disclosure. System 100 may include a host 102, a host interface 114, a storage controller circuit 118, and a memory 106. The host interface 114, storage controller circuit 118, and memory 106 may together comprise a data storage device (DSD) 122, such as a solid state drive (SSD), a hard disc drive (HDD), or a combination thereof. The storage controller circuit 118 may be a data storage controller configured to control access to a single memory 106 (e.g. a set of Flash die or a stack of hard disc platters), or the storage controller circuit 118 may control access to a plurality of homogeneous or heterogeneous memories, such as in a network attached storage (NAS) environment.

Host devices 102, such as server devices, desktop computers, laptop computers, etc. may issue commands and indicators to attached devices, such as data storage devices (DSDs) 122. Commands and indicators may be received at the DSD 122 via the host interface 114. The commands may include input or output (I/O) commands (e.g. read, write, or erase data storage commands), administrative commands (e.g. commands to identify the attached device, determine device features, set parameters for the device, configure command queues, etc.), or other types of commands. The commands may be placed into command queues 120 by the host device 102, and an attached device 122 may retrieve the commands from the command queues 120 for execution. The DSD 122 may return a command status indicator to the host 102 once the command has completed or otherwise terminated.

The DSD 122 may include one or more storage controller circuits 118. The storage controller circuit 118 may be a controller for a nonvolatile memory express (NVMe)-based storage device 122 configured to communicate with the host 102 via a host interface 114 and a controller interface 115, such as a peripheral component interconnect express (PCIe) communication bus; however, other embodiments are also possible. NVMe is a specification for accessing some nonvolatile memory devices, such as SSDs, HDDs, hybrid devices including multiple types of storage mediums, or any combination thereof. The NVMe specification offers functionality which takes advantage of the low latency and parallelism provided by SSDs and PCIe communication. The storage controller circuit 118 may include one or more control circuits, processors, memories (e.g. non-volatile memory, Dynamic Random Access Memory (DRAM), other types of memory, etc.), communication busses, other components, or any combination thereof.

The DSD 122 may be a multi-function device, such as a PCI device offering multiple independent functions (sometimes referred to as "virtual functions"). A host 102 may direct commands to particular functions of a device. For example, each device function on a PCI bus can have a configuration space, which is 256 bytes long, addressable by knowing the eight-bit PCI bus, five-bit device, and three-bit function numbers for the device (commonly referred to as the BDF or B/D/F, as abbreviated from bus/device/function). This can allow up to 256 buses, each with up to 32 devices, each supporting eight functions.

The functions of DSD 122 may include storage controller implementations, such as storage controller function 1 104 through storage controller function N 116. Storage controller functions may be implemented as hardware, firmware, or a combination thereof. For example, the storage controller functions may be multiple independent controller circuits, multiple virtual functions and executed on a single controller circuit, or any combination thereof. As used herein, "storage controller function" may refer to individual storage controllers, whether implemented as individual circuits or as storage controller instances implemented on a single circuit. A function level reset, as described herein, may be used to reset one or more storage controller functions on a single circuit, one or more storage controllers implemented on individual circuits within the DSD 122, or any combination thereof.

Each storage controller function may include components, including firmware and hardware, configured to process commands from a host 102 and access one or more memories 106 of the data storage device 122 via one or more memory interfaces 124. Memory interfaces 124 may include busses or other communication channels for transmitting data between the storage controller circuit 118 and memories 106 of the DSD 122. Storage controller functions may include a receiving unit 108, a completion unit 110, and a central processing unit (CPU) 112. The receiving unit 108, completion unit 110, and CPU 112 may include one or more chips, integrated circuit (ICs), or other circuits, and may additionally include software or firmware to control one or more operations. Some components may be shared between multiple storage controller functions. For example, the DSD 122 may have a storage controller circuit 118 having one receiving unit 108, one completion unit 110, and one CPU 112, with each unit having registers, queues, interfaces, or other components for each of the storage controller functions.

The receiving unit 108 may be configured to receive commands from the host 102 via host interface 114 and controller interface 115, and determine how or where to direct the command within the storage controller function 104. Commands received by the receiving unit 108 may be directed to a buffer memory or command queue of the DSD 122, directed to the CPU 112, or otherwise routed for further processing. The host 102 may also transmit a command indicator, such as a "doorbell" signal, notifying the storage controller function 104 that a command is pending and identifying how or where the command may be retrieved at the host 102. The receiving unit 108 may receive the command indicator, and then retrieve the identified command from the host 102. For example, a host 102 may place commands into a command queue 120 at the host device 102 for retrieval by the DSD 122.

Command queues 120 may include submission queues for commands submitted by the host 102 for processing at the DSD 122, and completion queues to which the DSD 122 may store information regarding the status of a host command processed by the DSD 122. Command queues 120 may be associated with a particular function of the DSD 122. For example, a submission queue may be identified by a submission queue ID (SQ ID) and storage controller ID. Only commands intended for a specific function may be placed into a command queue 120 associated with that function.

After receiving a command indicator from the host 102, the receiving unit 108 may retrieve a corresponding command from a submission command queue 120 of the host 102. The command queues 120 may alternately be located at the DSD 122, with the host 102 issuing commands to the DSD 122 to be placed into a particular queue 120.

The controller interface 115 may be configured to handle communications between the host 102 and the data storage device 122, and may include circuits, registers, firmware or other logic, or any combination thereof. For example, the controller interface 115 may include a PCIe arbiter to direct commands or indicators from the host interface 114 to the receiving unit 108 of the appropriate storage controller function. The controller interface 115 or receiving unit 108 may determine which storage controller function a command is directed to, and may handle the command accordingly. All I/O commands for a storage controller function 104 may pass through the associated receiving unit 108, and therefore the receiving unit 108 may be a first "gatekeeper" for received host commands.

The completion unit 110 may be configured to transmit, to the host 102, a status indicator for commands received from the host 102. For example, the completion unit 110 may receive a notification from the CPU 112 or another component of the storage controller function 104 that an I/O operation has been completed successfully. The completion unit 110 may then store a command identifier (ID) for the completed command to a completion queue on the host 102, to notify the host that the command was completed successfully. The completion unit 110 may optionally transmit data requested by a command, such as a file or data associated with a read request. Read data may also be stored to the host 102 by another component of the DSD 122, for example before the completion unit 110 notifies the host 102 that the data has been read and stored to the host 102 successfully. The completion unit 110 may receive a notification from other components of the storage controller function 104 for most or every completed host command, and may thereby act as a final "gatekeeper" for completed host commands processed by the storage controller function 104.

The CPU 112 may perform processing for received commands, control the operation of components of the storage controller function 104, control or generate signals or commands to devices attached to the storage controller function 104 such as memory 106 or host 102, perform other operations, or any combination thereof.

At times, a host device 102 may issue a function reset indicator or other command directing the DSD 111 to perform a function level reset (FLR) of a selected function of DSD 122, such as storage controller function 1 104. For example, the function may have become unresponsive or otherwise need to be reset. A host 102 may reset the entire DSD 102, but this may interfere with the performance of other functions and other commands being processed. Optimally the host 102 may reset the selected function rather than the entire DSD 122 or all functions on the DSD 122. The DSD 122 may implement the FLR by deleting or clearing all command queues 120 and registers associated with the selected function. Deleting the command queues 120, in turn, may include aborting all commands received from those command queues 120. The storage controller circuit 118 may use the CPU 112, receiving unit 108, and completion unit 110 to reset a selected function 104.

However, locating and terminating specific commands may be difficult in some embodiments, such as when commands for multiple storage controller functions are processed by the same storage controller circuit 118 and shared storage controller components. A storage controller circuit 118 may implement multiple storage controller functions 104 and 116, which may be processing hundreds or thousands of commands, from multiple queues 120, executed out-of-order from the order in which they were placed into command queues 120. In order to improve performance of the DSD, queues 120 from a selected storage controller function 104 may be deleted and the associated commands aborted without interfering with the execution of other commands from other storage controller functions 116.

In order to explain a process for aborting commands at the DSD 122 as part of the queue deletion and FLR process, an example method for processing commands at the DSD 122 using a command table will be provided. A method of receiving commands for processing and generating entries in a command table is discussed in relation to FIG. 2.

Figure 2:
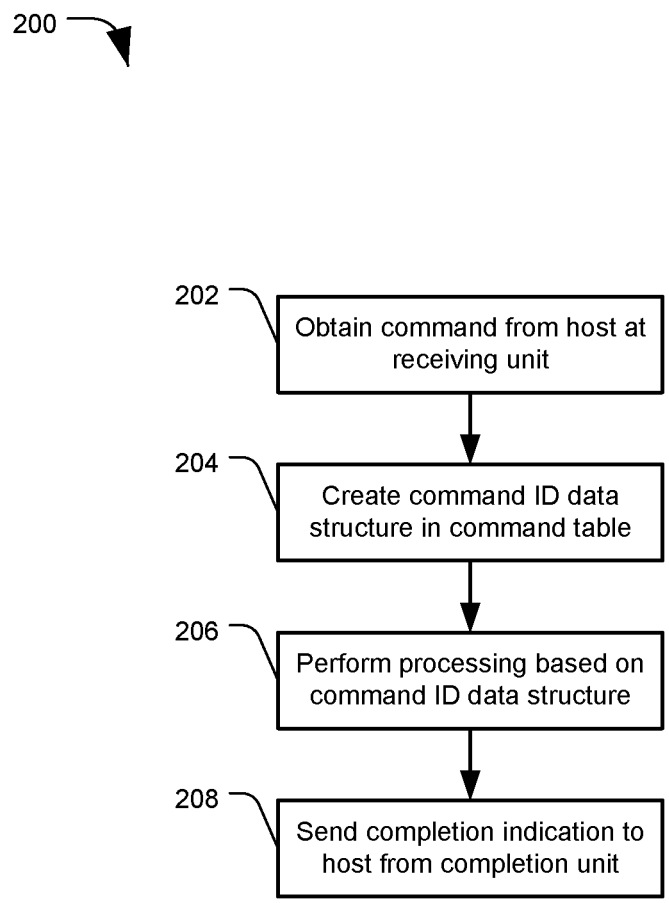
FIG. 2 is a flowchart of a method perform a function level reset in a memory controller, in accordance with certain embodiments of the present disclosure.

FIG. 2 is a flowchart of a method 200 to receive and process a command, in accordance with certain embodiments of the present disclosure. The method 200 may include a method for processing an input/output (I/O) command at a storage controller of a DSD, such as storage controller function 104 of FIG. 1. The method 200 may include obtaining a command from a host at a receiving unit of a storage controller, at 202. The receiving unit may correspond to receiving unit 108 of FIG. 1. The host may send a command "doorbell" signal or other indicator to notify the DSD that a host command is ready. The indicator may include information about a pending command, such as a command ID, a storage controller or virtual function ID (VF ID) indicating which storage controller function of the DSD should process the command, and a submission queue ID (SQ ID) indicating a command queue from which the pending command may be retrieved. Obtaining a command, at 202, may include retrieving a pending command from a submission queue at the host.

The method 200 may include creating a command ID data structure in a command table stored at the storage controller, at 204, based on the command obtained at 202. For example, the storage controller may maintain a table in an SRAM or other memory of the storage controller. The table may include a set of command ID data structures, pointers to command ID data structures, or may otherwise include information on commands received for execution. The command ID data structure may include the command obtained from the host and other associated control information. For example, the command ID data structure may include the command ID, the VF ID, and the SQ ID received from a host, the type of command, data to read or write or a storage location therefor, an indicator of whether the command is still valid, an abort bit indicating whether the command has been marked for aborting, other information, or any combination thereof. The command table may be accessed by components of an I/O processing pipeline within the storage controller to determine or update the status of commands during processing.

The method 200 may include performing processing based on the command ID data structure, at 206. Circuits or modules of an I/O pipeline may access the command table to determine the type of command and how to proceed with processing. For example, a cache module may consult the command table to determine that a read command was received from a host, the read command including an LBA range to read from the DSD. The cache module may determine whether the LBA range is at least partially stored to a cache memory (e.g. a DRAM connected to the storage controller). If so, the cache module may direct retrieval of the data from the cache memory and storing the data to the host. If the requested LBA range was not completely stored in the cache, the cache module may notify a Flash access module of the pending command. The Flash access module may consult the command table to determine LBAs to retrieve per the command, and may send instructions to a Flash memory connected to the storage controller to retrieve the designated LBAs and store the associated data to the host. Other processing may also be performed.

During processing, the components of the processing pipeline may check whether an "abort bit" is set for the current command ID data structure in the command table. If it is, the component may abort processing of the command, may notify the CPU that the command was aborted, may update a status of the command in the command table, may perform other functions, or any combination thereof.

Once the processing for a command is completed, the completion unit may optionally send an indication to the host, at 208, such as by storing information on the completed command to a completion queue of the host device. The completion unit may send a completion indication stating that the command completed successfully or was aborted. For example, if command ID 1234 was aborted, the completion unit may store an indicator in a host completion queue, such as "Command ID: 1234; Status: Aborted". An example embodiment of a storage controller including an I/O pipeline is depicted in FIG. 3.

Figure 3:
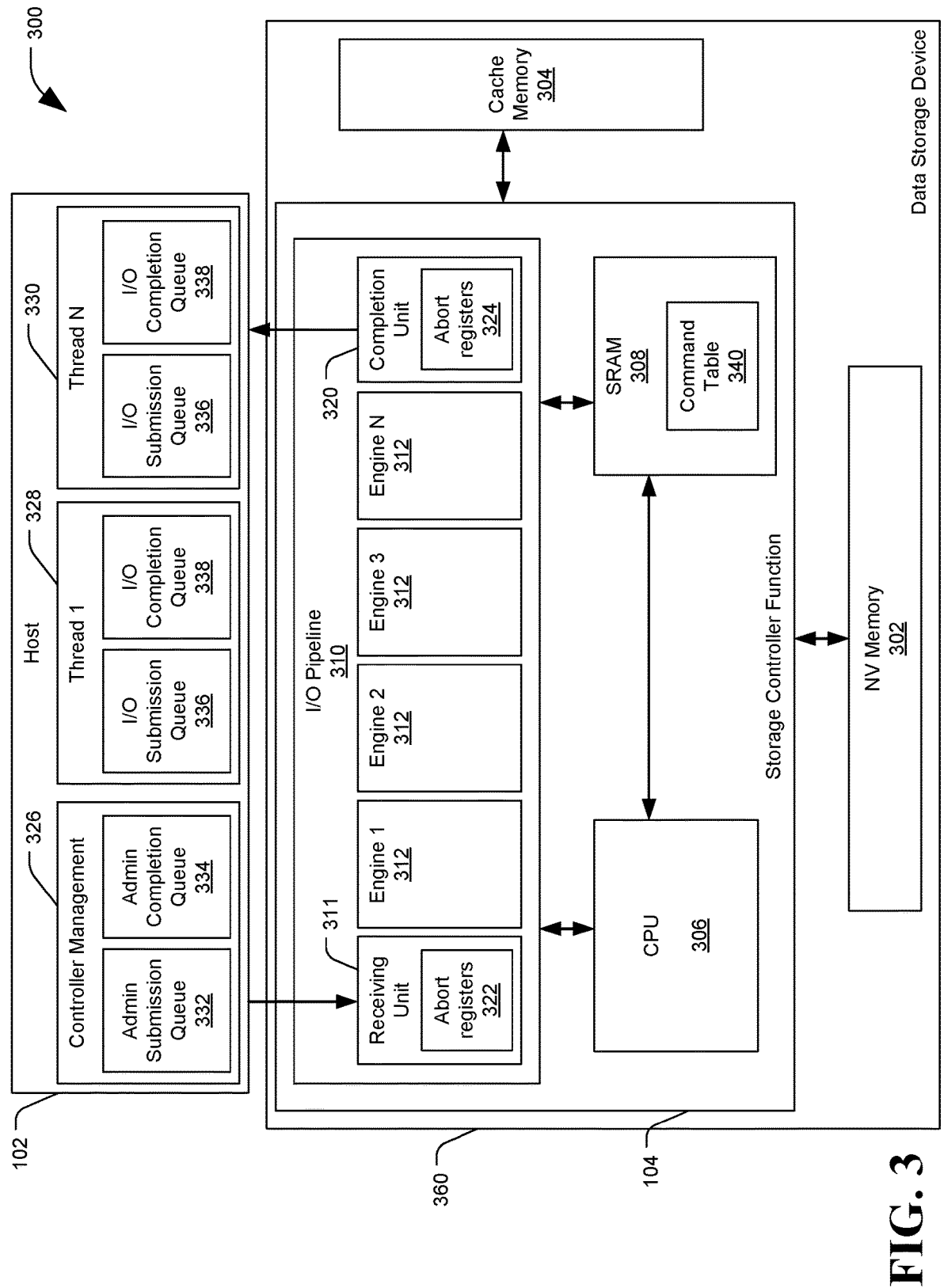
FIG. 3 is a diagram of a system configured to perform a function level reset in a memory controller, in accordance with certain embodiments of the present disclosure.

FIG. 3 is a diagram of a system 300 configured to perform a function level reset in a storage controller, in accordance with certain embodiments of the present disclosure. System 300 may include a host 102 and data storage device (DSD) 360. The host 102 may issue a function level reset (FLR) command to direct the DSD 360 to reset one or more storage controller functions 104 of the DSD. The host and storage controller functions of system 300 may correspond to host 102 and storage controller function 1 104 of FIG. 1, respectively. One or more storage controller functions 104 may be included on a single or multiple storage controller circuits of the system 300. For example, storage controller function 104 may depict a storage controller circuit including a CPU 306, an input-output (I/O) pipeline 310, and other components that implement a plurality of storage controller functions on the storage controller circuit. The storage controller circuit may receive the FLR command to reset a selected one or more of the plurality of storage controller functions using the shared components of the circuit.

The storage controller function 104 (which may include a storage controller circuit configured to execute a plurality of storage controller functions) may include a CPU 306, an SRAM 308, and an I/O pipeline 310. The storage controller function 104 may be configured to receive I/O commands from the host 102 at a receiving unit 311, process the received commands using the I/O pipeline 310 and CPU 306, and return a result to the host 102 via a completion unit 320. The storage controller function 104 may be connected to one or more primary nonvolatile (NV) memories 302, such as a Flash solid state memory or a hard disc drive (HDD), one or more cache memories 304 such as dynamic random access memory (DRAM), other memories or components, or any combination thereof. The storage controller function 104, NV memory 302, and cache memory 304 may be included within a casing or housing of the data storage device (DSD) 360, which may be removable from host 102.

The CPU 306 may be used for general processing, for managing or coordinating processes within the storage controller function 104, for other operations, or any combination thereof. The SRAM 308 may provide operating memory for use by the storage controller function 104 during processing and operation. For example, the SRAM 308 may store a command table 340 storing information regarding commands received for processing by the storage controller function 104. The command table 104 may correspond to the command table described in regards to FIG. 2.

The receiving unit 311 may receive commands from the host 102, may receive an indicator that a command is available and then retrieve the command from the host 102, or may otherwise obtain commands for processing. The receiving unit 311, or another component, may generate a command ID data structure based on received commands, and store the command ID data structure to the command table 340. Both I/O commands from I/O submission queues 336 and admin commands from admin submission queues 332 may have corresponding command ID data structures added to the command table. However, some operations such as FLR commands may be delivered to the DSD 360 independent of any command queues, and may not have an entry in the command table 340.

The receiving unit 311 may direct commands to a next component in the I/O pipeline 310 for processing, such as by sending the component an indicator to retrieve information on the command from the command table 340 and perform processing. The completion unit 320 may receive a notification when the storage controller function 104 has finished processing a command, and may send a notification to the host 102 that the command has been executed.

The I/O pipeline 310 may include a number of components or engines 312 configured to receive, process, and return a status for I/O commands received from the host 102. The engines 312 may include modules configured to perform one or more processing tasks related to a received command. In the depicted embodiment of FIG. 3, the I/O pipeline 310 may include N engines 312 in addition to the receiving unit 311 and the completion unit 320. A command received by the storage controller function 104 may be handled by one or more of the N engines 312 in the I/O pipeline 310. For example, a command may be handled by each engine 312 in sequence, starting with engine 1 and ending with engine N, before the status of the command is reported to the host 102 by completion unit 320. The engines 312 may perform tasks such as checking a cache memory 304 for requested data, buffering commands pending execution, accessing attached memory components such as NV memory 302, performing other operations, or any combination thereof. Data may be passed between engines 312 of the I/O pipeline and between other components of the storage controller function 104 via one or more data busses. Status and data related to commands may be retrieved from the command table 340 by the engines 312. The engines 312 and functions described herein are exemplary, and components and functions may be changed, added, or removed without departing from the scope of the present disclosure.

The storage controller function 104 may be part of a nonvolatile memory express (NVMe) controller configured to receive commands through a Peripheral Component Interconnect Express (PCIe) bus, and may be configured to support parallel operation and multiple host command queues. NVMe devices may be configured to work with a paired submission queue (SQ) 336 and completion queue (CQ) 338 mechanism. SQs 336 and CQs 338 are examples of command queues and may be allocated and located in the host's 102 memory, for example in the form of circular buffers with a fixed slot size. Commands to be executed by the storage controller function 104 may be placed into the SQs 336 by software or operating systems of the host 102. Commands may be retrieved from SQs 336 by the storage controller function 104 (e.g. via the receiving unit 311). Completed command indicators or notifications may be placed into an associated CQ 338 by the storage controller function 104 (e.g. via the completion unit 320). Multiple SQs 336 may share a CQ 338, so that completion indicators for commands from the multiple SQs 336 may be placed into the same associated CQ 338. SQs 336 and CQs 338 may be associated with a single storage controller function 104 of the DSD 360, so that each command queue has one associated storage controller function 104, but each storage controller function 104 may have multiple associated command queues.

The host 102 may include one or more processing threads for handling SQs 336 and CQs 338. Each thread may handle one or more SQ 336 and CQ 338. The processing threads may include a controller management or "admin" thread 326, and additional processing threads 1 328 to processing thread N 330. The processing threads may be computing modules, where a "module" may be one or more physical components of a computing device (e.g., circuits and memories) configured to perform a particular task or job, or it may be a program that, when executed, causes a processor to perform the particular task or job. In the depicted embodiment the modules may be software processing threads or processor cores of a physical processing unit. Controller management module 326 may include one of the N processing threads, a separate processor circuit, a control module executed by one of N processing cores, another component, or any combination thereof.

Input-output (I/O) SQs 336 and CQs 338 may be used for data access commands, such as read commands, write commands, erase commands, other data access commands, or any combination thereof. The host 102 may also generate administrative, or "admin," SQs and CQs, such as admin SQ 332 and admin CQ 334 of the controller management module 326. Admin SQs 332 and CQs 334 may be used for admin commands from an administrative command set. Admin commands may be used for device management and control. For example, admin commands may be used to create and delete I/O SQs 336 and CQs 338, abort commands, identify an attached device (e.g. storage controller function 104 or its associated data storage device), set device parameters, perform function level resets (FLRs), perform other administrative operations, or any combination thereof.

The host 102 may generate a command and place it as an entry into a submission queue, such as admin SQ 332 or I/O SQ 336. The command may include a command ID, a submission queue ID (SQ ID) identifying the SQ into which the command is placed, a virtual function ID (VF ID) identifying the storage controller function 104 associated with the SQID, information identifying data to store to or retrieve from a storage device, other information, or any combination thereof. For example, a write I/O command may include the location of data stored to the host, which data can then be retrieved by the DSD 360 and stored to NV memory 302. A command to delete a SQ 336 may include its own command ID and SQ ID, and may also include the SQ ID for the selected queue to be deleted.

After placing a command into an SQ, the host 102 may send the storage controller function 104 a "doorbell" or other indicator that a command is pending in an SQ. For example, the host 102 may update a doorbell register of the storage controller function 104 associated with a submission queue when there are new commands to execute. A previous doorbell register value may be overwritten in the storage controller function 104 when there is a new doorbell register write associated with a given submission queue. The receiving unit 311 may include one or more doorbell registers, such as one or more registers which can be associated with each submission queue, up to a maximum number of submission queues supported by the storage controller function 104. The receiving unit 311 may then fetch a command from the submission queue based on the doorbell register. The storage controller function 104 may fetch commands from the host 102 in an order specified by the submission queue associated with the doorbell register (i.e. retrieving commands from a head of the queue), but execute received commands in any order.

As described above, a host 102 may issue a command to perform a function level reset (FLR) at the DSD 360. An FLR command may be issued as an admin command in the admin queue 332, or may be delivered to the DSD 360 another way. For example, the host 102 may store an FLR command indicator to a device control register of the DSD 360 (which e.g. may be included in a controller interface 115 of FIG. 1), where a PCIe arbiter may forward the FLR command to the receiving unit 311, the CPU 306, or other components of the storage controller function 104. The FLR command may identify a storage controller function 104 or other function of the DSD 360 to reset, such as by including a VF ID for the function in the command, by storing the FLR command indicator to a register associated with the target storage controller function, or by any other indicator.

In response to receiving the FLR command, the storage controller function 104 may implement procedures to delete the command queues, such as SQs 336 and CQs 338, associated with the storage controller function 104 targeted for reset. Deleting the command queues may include aborting all commands associated with or received via those command queues.

An example process for aborting a command as part of an FLR and queue deletion procedure is now described. After receiving a command from the receiving unit 311, from the PCIe arbiter, or from another source, the CPU 306 may determine whether the command is an FLR command. When an FLR command is identified, the CPU 306 may generate one or more abort indicators corresponding to the selected storage controller function at the receiving unit 311, at the completion unit 320, or both. By setting the abort indicators at the receiving unit 311 and completion unit 320, the CPU 306 can stop receipt of new commands for the selected function and stop the delivery of completion indicators for commands from the selected function.

The CPU 306 may generate the abort indicators by updating one or more abort registers 322 and 324 at the receiving unit 311, at the completion unit 320, or both. The receiving unit 311 and the completion unit 320 may comprise circuits including a small amount of data storage dedicated to abort registers 322 and 324. The abort registers 322 and 324 may be updated with information identifying functions designated for resetting, indicating that commands associated with the selected functions should be ceased or aborted. When a host 102 has directed the resetting of a storage controller function, the CPU 306 may store an abort tracking indicator identifying the selected function, such as a VF ID, to the abort registers 322 and 324. For example, a storage controller circuit implementing multiple storage controller functions 104 may include a receiving unit 311 and completion unit 320 that service multiple storage controller functions, such as via registers designated for each function. Storing VF ID values at the shared receiving and completion units may allow the units to identify which storage controller function is to be reset. In some embodiments, each storage controller function 104 may include its own receiving unit 311 and completion unit 320. In such cases, a simple FLR indicator may be stored at the abort registers 322 and 324, such as a set bit or flag, without the need to identify a selected storage controller function to reset. Other methods of identifying a function for resetting are also possible, such as by writing a disable bit associated with the selected function.

When a selected function is identified for reset to the receiving unit 311, the receiving unit may stop fetching any commands from queues associated with the selected function, dropping the associated queues from command or queue priority arbitration. Dropping the associated queues from arbitration may prevent any new commands for the selected storage controller function 104 from being received and requiring aborting. Commands that are already in-progress may finish being fetched by the receiving unit 311, although the completion unit 311 may send an abort completion message to the CPU 306 when any in-progress commands are finished being fetched.

When the completion unit 320 receives a command for which processing has completed, it may determine whether the completing command is associated with a storage controller function 104 selected for reset. For example, the completion unit 330 may compare an VF ID associated with the received command against any VF IDs identified in the abort registers 324. If there is no match, the completion unit 320 may notify the host that the command finished processing, such as by storing an indication to a CQ 338. However, if the received command is from a selected function 104, the completion unit 320 may not submit a command completion notification to the host 102, and may instead notify the CPU 306 that a command associated with a function 104 selected for reset was located and aborted.

In addition to setting the abort registers 322 and 324, the CPU 306 may search for any commands pending at the DSD 360 and associated with the storage controller function 104 selected for reset. The CPU 306 may search the command table 340 for commands having an associated VF ID that matches the selected storage controller function, for example in embodiments where multiple storage controllers share a command table 340. For each command with a matching VF ID found in the command table 340, the CPU 306 may set an abort flag or bit in the selected command's data structure. In embodiments where each storage controller function 104 has its own command table 340, the CPU 306 may identify the command table 340 associated with the selected storage controller function, and set an abort flag or bit to "true" for every command in the command table 340.

When engines 312 of the I/O pipeline 310 receive a command for processing, they may look the command up in the command table 340. The engines 312 can then detect that the "abort" bit has been set, and may abort execution of the command. The engine 312 may send an indicator to the CPU 306 that a command associated with the selected queue has been aborted. In this manner the storage controller function 104 can locate and abort commands associated with the selected storage controller function 104 without disrupting the execution of other pending commands at other storage controller functions, even when commands are executed out-of-order across multiple functions.

If the storage controller 104 had finished processing a command via the I/O pipeline 310 before the CPU 306 located the command in the command table 340, setting the abort pending bit in the table may be too late to abort the command at an I/O pipeline engine 312. By setting an abort register 324 at the completion unit 320 before searching the command table 340, the completion unit 320 can still catch and abort the command as it completes.

In some implementations, the receiving unit 311 may be in the process of receiving one or more commands from the selected SQ 336 when the CPU 306 generates an abort indicator in the abort registers 322. While the receiving unit 311 may not begin receiving any new commands from the selected CQ 336, the receiving unit 311 may still complete the process of receiving any commands already in progress. This may result in the receiving unit 311 generating a data structure for the received command to store to the command table 340 after the CPU 306 has begun or completed its search of the table 340. Accordingly, the receiving unit 311 may be configured to set the abort bit in the data structure of any command that finishes being received after a corresponding abort indicator is set in the abort registers 322. The receiving unit 311 may also notify the CPU 306 about the received command, and the CPU 306 may set the abort bit. In another example, the CPU 306 may perform a second scan of the command table 340, in order to locate commands that may have been received after the initial scan was performed. In yet another example, commands received after a scan of the command table 340 may still be aborted at the completion unit 320, even if an abort bit for the command was not set.

The host 102 may assume that the FLR has completed after a certain time period (e.g. 100 ms) has elapsed from receiving an FLR command acknowledgement from the DSD 360. Once the host 102 receives an acknowledgement, the host 102 may also stop responding to requests from the DSD 360 corresponding to the selected function, which may interfere with commands or transfers currently in progress. In order to avoid having the FLR not complete within the time period, the CPU 306 may delay sending the acknowledgement until it has verified that there are no operations in progress that may be interrupted by sending an acknowledgement or otherwise cause the FLR command completion to be delayed. For example, the CPU 306 may verify that no commands for the selected function 104 are in the process of being received. The CPU 306 may also perform a scan of the command table 340 to set abort bits and verify that no commands associated with the selected function 104 are outstanding at Flash controllers for NV Memory 302 prior to sending the acknowledgement.

The storage controller function 104 may maintain a counter of commands associated with submission queues 336, associated with storage controller function 104, or both. For example, the receiving unit 311 or CPU 306 may maintain a counter for each storage controller function 104 and for each SQ 336 associated with each storage controller function 104. The corresponding counters may be incremented every time a command is received for a particular function 104 and from a particular queue, and decremented every time a command from the particular queue is completed (e.g. successfully processed and reported to the host via the completion unit 320, or aborted at the storage controller function 104). In another example, when the CPU 306 scans the command table 340 for commands having a VF ID matching the storage controller function 104 selected for reset, the CPU 306 may increment a counter for each matching command located. In embodiments where commands are received after the command table 340 scan is performed, the receiving unit 311 may notify the CPU 306 about the received command so that the counter may be incremented, or new commands may be located on a subsequent scan of the command table 340.

When the CPU 306 receives a notification from a component of the I/O pipeline that a command associated with the selected function 104 has been aborted, the CPU 306 may send a notification to the completion unit 320 to release any resources reserved for the aborted command. The CPU 306, the completion unit 320, or another component may decrement a command counter for the selected function 104, the SQ 336 associated with the aborted command, or both. When the command counter for a SQ 336 reaches 0, the queue may be considered deleted. When the command counter for the selected function 104 reaches 0, when the queue counters for all SQs 336 associated with the selected function 104 reach 0, or both, the CPU 306 may determine that all outstanding commands for the selected function 104 have been completed or aborted.

When all commands associated with the selected storage controller function 104 have been aborted, the CPU 306 may reset registers and functions associated with the selected storage controller function 104. For example, the PCIe function, abort registers 322 and 324 associated with the selected function 104, and other registers may be reset to 0 or null values. Resetting the registers and functions of the storage controller function 104 serves to reset the function 104. Certain registers, such as those containing basic input output system (BIOS) information and other fundamental operating information for the data storage device 360, may not be reset.

Once the selected storage controller function 104 has been reset, the DSD 360 may optionally notify the host 102 that the FLR command has completed successfully. In some embodiments, the host may assume the FLR has completed after a time period (e.g. 100 ms) from receiving an acknowledgement from the DSD 360 that the FLR command was received. The host 102 may deallocate the memory locations for command queue(s) associated with the selected function 104 in response to the completion indicator or the time period expiring. Example methods of performing a function level reset are also discussed in relation to FIGS. 4 through 7.

Figure 4:
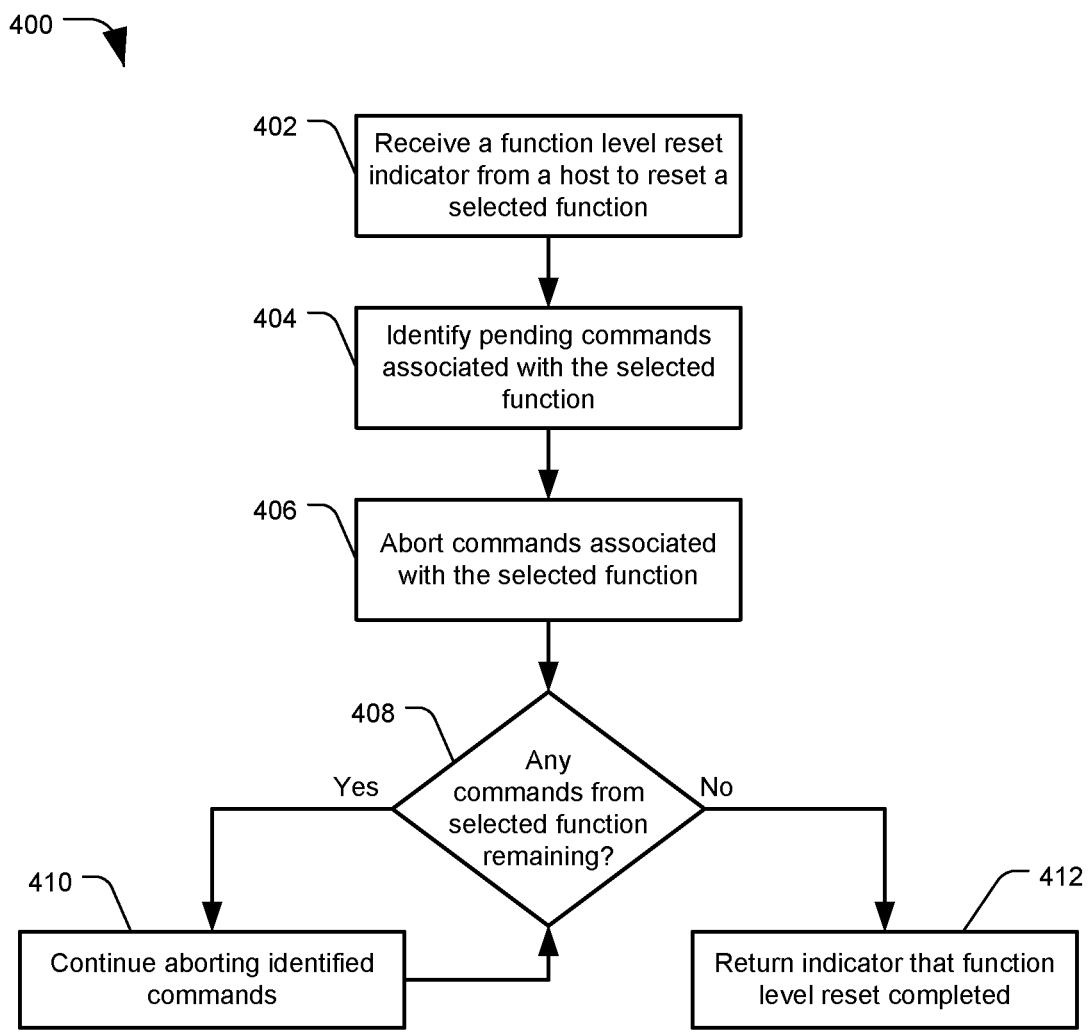
FIG. 4 is a flowchart of a method to perform a function level reset in a memory controller, in accordance with certain embodiments of the present disclosure.

FIG. 4 is a flowchart of a method 400 to perform a function level reset in a memory controller, in accordance with certain embodiments of the present disclosure. The method 400 may be performed by one or more components of a storage controller circuit or storage controller function, such as storage controller circuit 118 of FIG. 1 or storage controller function 104 of FIG. 3. The method 400 may include receiving, at a data storage device (DSD), a function level reset (FLR) command indicator from a host to reset a selected function of the DSD, at 402. The selected function may be a storage controller function instance of a storage controller circuit that can execute a plurality of storage controller functions simultaneously. The function level reset indicator may be in the form of a bit, flag, or instruction code written by the host to a device control register of the DSD. In another example, a receiving unit of the selected storage controller function may receive a doorbell indicator or other notice that a function level reset command is pending at the host, and the receiving unit may retrieve the command from the host. The function level reset command indicator may include information such as a virtual function identifier (VF ID) for the selected function to be reset, the indicator may be stored to a register associated with the selected function, or the indicator may otherwise inform the DSD which function is to be reset.

The method 400 may include identifying pending commands associated with the selected function, at 404. The DSD may maintain one or more command lists or tables having data structures for each received host command. One command table my include information on commands being processed by multiple storage controller functions. The command data structures in the table can include fields identifying the type of command, a command ID, an SQ ID for a queue from which the command was received, a VF ID identifying which of a plurality of storage controllers at a data storage device the command is intended for, other information, or any combination thereof. A storage controller function of the DSD may evaluate each command in the list to determine whether the VF ID of the command matches the selected function from the FLR command. When a match is found, the storage controller function may set an abort bit or flag in that command's data structure to '1' or 'true'.

The DSD may also verify that no commands for the selected function are in the process of being received from the host, or are at a Flash or other memory controller, which may delay completion of the FLR. Once verified, the DSD may send an acknowledgement to the host that the FLR command was received.

The method 400 may include aborting commands associated with the selected function, at 406. As commands are processed at the storage controller function, they may pass between components or engines in an I/O pipeline. When a component of the I/O pipeline receives a command for processing, the component may consult the command table to determine whether an abort bit or flag has been set for that command. If the abort bit has been set, the engine may cease processing the command and instead send an abort notification or indicator to a CPU. For each command aborted pursuant to a queue deletion command, the CPU may optionally remove the command from the command list or table, or otherwise mark it as aborted.

The method 400 may include determining whether any commands from the selected function remain pending at the storage controller function, at 408. If a command is removed from the command table when it is aborted, a scan of the table can reveal when no more commands from the selected queue remain. In another embodiment, a count of outstanding commands from the selected function may be maintained. For example, a counter may be maintained for every queue, every storage controller function, or both. The counters can be incremented when a new command is received and decremented when a command is completed or aborted. A count of outstanding commands may also be made when searching the command table for commands with a matching VF ID.

Every time a command from the selected function is aborted, the counter for that function may be decremented by 1. If the counter indicates commands from the selected function remain, at 408, the method 400 may include continuing to abort commands from the selected function, at 410, and monitoring for when all commands have been aborted, at 408.

When all commands for the selected function have been aborted, for example when the counter reaches 0, the method 400 may completing the FLR, at 412. Completing the FLR may include clearing or nulling registers or other data locations associated with the selected function at the DSD. The DSD may optionally send a completion indicator to the host that the FLR command completed.

Figure 5:
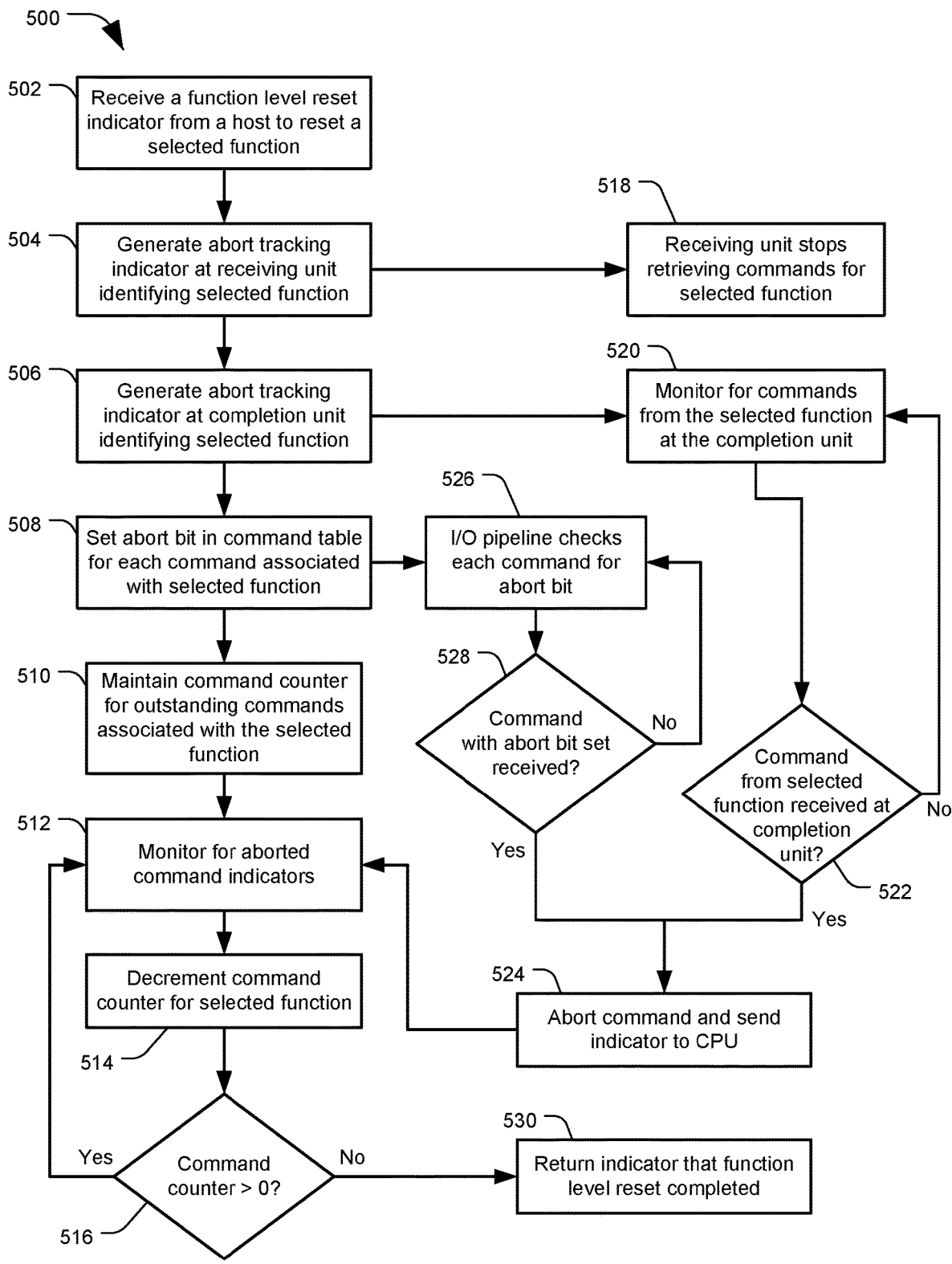
FIG. 5 is a flowchart of a method to perform a function level reset in a memory controller, in accordance with certain embodiments of the present disclosure.

Turning now to FIG. 5, a flowchart of another method 500 to perform a function level reset in a memory controller is depicted, in accordance with certain embodiments of the present disclosure. The method 500 may be performed by one or more components of a storage controller circuit or storage controller function, such as storage controller circuit 118 or storage controller function 104 of FIG. 1. Method 500 may include receiving a function level reset (FLR) indicator or command from a host to reset a selected storage controller function of a data storage device (DSD), at 502. The DSD may return an acknowledgement indicator to the host, potentially after verifying that no transfers with the host or data storage memories are in progress.

In response to receiving the FLR command, the selected storage controller function (e.g. via a CPU) may generate an abort tracking indicator at a receiving unit of the storage controller function, at 504. The abort tracking indicator may identify the selected function, such as using a virtual function identifier (VF ID). The receiving unit may be a component of the DSD configured to receive commands for one or more storage controller functions. The receiving unit may include registers to which abort indicators may be stored. At 518, the receiving unit may stop retrieving or receiving commands directed to the storage controller function identified by the abort tracking indicator. This may ensure that no new commands are received for the storage controller function while the FLR is being executed.

The method 500 may include generating an abort tracking indicator at the completion unit, at 506. The completion unit may receive commands that have finished processing at one or more storage controller functions and issue command status notifications to the host device. The abort tracking indicator may be generated by storing information about the selected function to a register or other memory accessible by the completion unit.

At 508, the method 500 may include setting an abort bit in a command table for each command associated with the selected function. Locating associated commands and setting an abort bit may be performed as described in regards to 404 of method 400.

The method 500 may include maintaining one or more command counters for a number of outstanding commands associated with the selected function, at 510. As described previously, a command counter value may be set by counting a number of commands pending at the DSD and associated with the selected function. In some embodiments, a command counter may be maintained for each submission queue, with the submission queues grouped based on a storage controller function with which they are associated. Command counters may be increased when commands are received and decreased when commands are completed or aborted.

The method 500 may include monitoring for aborted command indicators, at 512. Components of the storage controller function, such as engines or modules of an I/O processing pipeline, may abort commands identified as associated with the selected function, and notify a CPU of the storage controller function.

For example, at 520 the completion unit may monitor completing commands for commands associated with the selected function (e.g. based on comparing a VF ID associated with the command to the abort tracking indicator set at 506). The completion unit may determine whether a received command is from the selected function, at 522. If not, the completion unit may resume monitoring completing commands, at 520. If the command is from the selected function, the completion unit may abort the command and send a command aborted indicator to the CPU, at 524.

Similarly, at 526 the processing engines, components, or modules of an I/O pipeline may check a command table to determine whether a command received for processing at the engine has an abort bit set, at 508. If the command does not have an abort bit set, at 528, the method 500 may include performing processing on the command and continuing to check for abort bits on subsequent commands, at 526. If a command with an abort bit is found, at 528, the I/O pipeline engine may cease processing the command, and send an abort indicator to the CPU, at 524.

Abort indicators generated at 524 may be received by a CPU at 512, while monitoring for abort indicators. In response to receiving an abort indicator, the method 500 may include decrementing the command counter for the selected queue. The aborted command may be removed from the command table, and an abort indicator may be returned to the host for the command.

After decrementing a command counter based on an abort indicator, the method 500 may include determining whether the command counter is greater than 0, at 516, indicating that commands still remain pending for the selected function. If the command counter is greater than 0, the method 500 may include continuing to monitor for aborted command indicators, at 512. If the counter is not greater than 0, then a determination may be made that all pending commands for the selected function have been aborted. In some embodiments, the determination that all pending commands have been aborted may be made when the individual command counters for each submission queue associated with the selected function have reached 0. Once all commands for the selected function have been aborted, the method 500 may then include completing the FLR, at 530. Completing the FLR may include clearing registers and values associated with the selected function, returning a completion indicator to notify the host that the FLR command has completed, or other steps. The host may optionally deallocate all command queues associated with the reset function, either when an FLR completion indicator is received, or after a time period has elapsed from receiving an FLR command acknowledgement.

Figure 6:
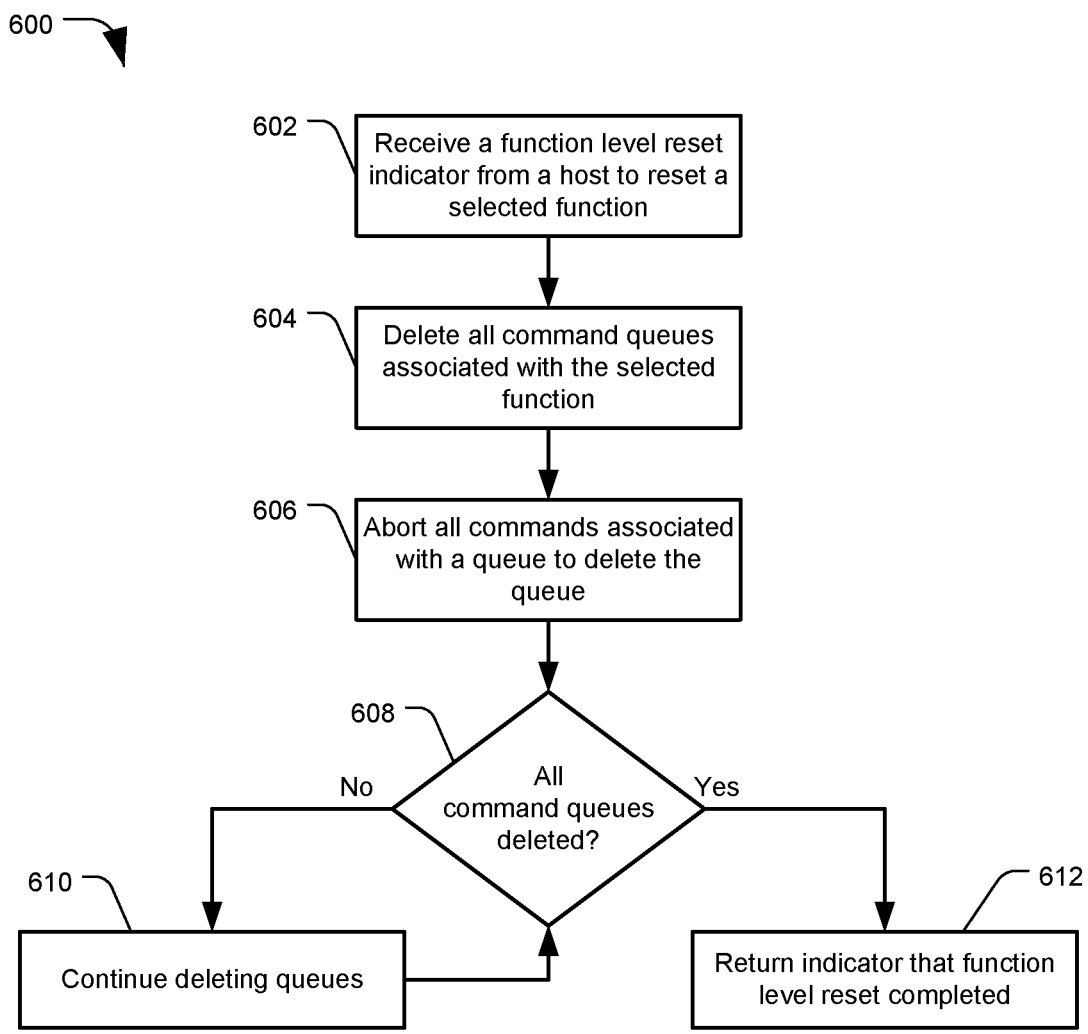
FIG. 6 is a flowchart of a method to perform a function level reset in a memory controller, in accordance with certain embodiments of the present disclosure.

FIG. 6 is a flowchart of another example method 600 to perform a function level reset in a memory controller, in accordance with certain embodiments of the present disclosure. The method 600 may include receiving, at a data storage device (DSD), a function level reset (FLR) command indicator from a host to reset a selected function of the DSD, at 602.

In response to the FLR command, the method 600 may include deleting all command queues associated with the selected function, at 604. As described above, each storage controller function of a DSD may have a plurality of associated command queues from which the storage controller function receives input/output (I/O) commands from the host. In order to delete each associated queue, the method 600 may include aborting all commands associated with each queue, at 606. The commands may be aborted by setting an abort bit or flag for each command in a command table having a submission queue identifier (SQ ID) matching a submission queue associated with the selected function. Components of the storage controller function may abort received commands when the abort bit is set, and a command counter for the corresponding command queue may be decremented. A queue may be considered deleted when all commands from the queue have been aborted.

The method 600 may include determining whether all command queues associated with the selected function have been deleted, at 608. If not, the method 600 may include continuing to delete associated queues, at 610, until all associated queues have been deleted. Once all associated command queues are determined to be deleted, at 608, the method 600 may include completing the function level reset.

Figure 7:
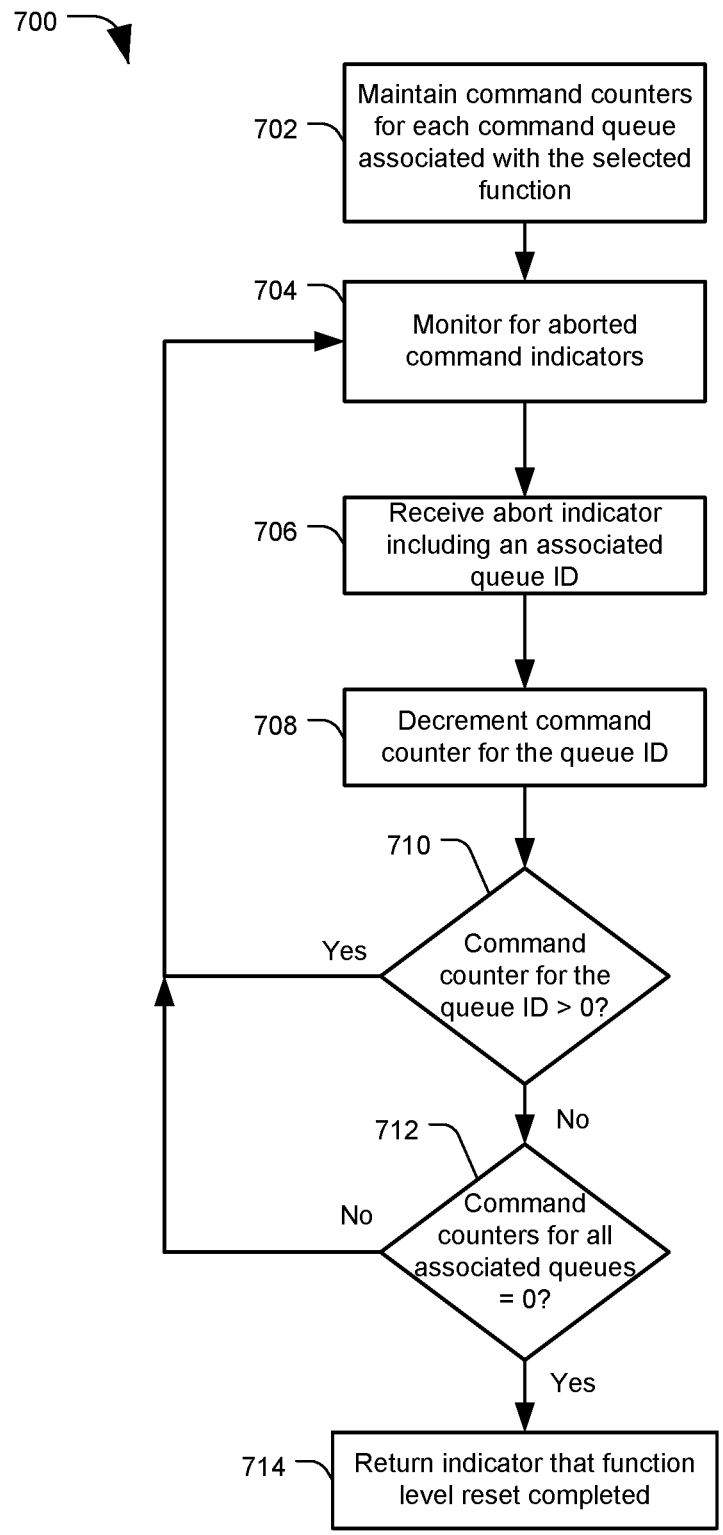
FIG. 7 is a flowchart of a method to perform a function level reset in a memory controller, in accordance with certain embodiments of the present disclosure.

FIG. 7 is a flowchart of a method 700 to perform a function level reset in a memory controller, in accordance with certain embodiments of the present disclosure. In particular, method 700 may include a method of maintaining multiple command counters for a storage controller virtual function, such as one command counter for each command submission queue associated with the storage controller function. The steps of method 700 may be an alternate to the elements following steps 508 of FIG. 5.

The method 700 may include maintaining command counters for each command queue associated with a selected function of a FLR command, at 702. For example, each storage controller function of a DSD may support up to four submission queues. The storage controller function may maintain a command counter for each associated submission queue, which may identify a number of commands pending at the storage controller function that were received from the respective queue.

At 704, the method may include monitoring for aborted command indicators received from processing engines of the storage controller function. Abort indicators may be received from the processing components at 706. The abort indicators may identify the aborted command, such as via a command ID, a submission queue ID (SQ ID) from which the command was received, a completion unit abort register identifier for the register to which information about targeted queues or functions was stored, or any combination thereof. Based on the abort indicator and the identified command, the method 700 may include decrementing a command counter for the submission queue associated with the aborted command, at 708.

The method may include determining whether the command counter for the queue ID associated with the aborted command is greater than 0, at 710. If yes, there are still pending commands associated with that submission queue, and the method 700 may include continuing to monitor for aborted command indicators, at 704. If the command counter for the queue ID is not greater than 0, at 710, then all commands associated with that queue ID have been aborted and the submission queue for that queue ID is effectively deleted. If the command counter for that queue ID is 0, the method 700 may include determining whether the command counters for all queues associated with the selected storage controller function equal 0, at 712. If not, there are still associated queues with pending commands, and the method 700 may include continuing to monitor for abort indicators, at 704. If the command counters for all associated queues are at 0, at 712, then a determination may be made that there are no more pending commands for the selected function. Registers and setting for the selected function may be reset or nulled out, and the method 700 may include returning an indicator to the host that the FLR command completed, at 714.

Using the methods disclosed herein, a storage controller may locate and abort commands associated with a storage controller function selected for reset, even processing environments with commands being processed by multiple storage controller functions on the same device, and without interrupting the operation of the other storage controller functions. The depicted methods and systems are exemplary, and modifications, exclusions, or additions may be made the methods and systems without departing from the scope of this disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
    a plurality of storage controller function instances, each storage controller function from the plurality of storage controller function instances having a plurality of queues for pending operations from a host device;
    a circuit configured to:
        receive a function reset indicator from the host device, the function reset indicator identifying a selected storage controller function from the plurality of storage controller function instances on which to perform a function level reset (FLR) operation to reset the selected function;
        perform the FLR to reset the selected function in response to the function reset indicator, including:
            abort each command from each of the plurality of queues associated with the selected storage controller function and pending at the apparatus, including:
                comparing a virtual function identifier associated with a command to a first abort tracking indicator stored to a completion unit configured to send command status indicators to the host device, the virtual function identifier indicating which storage controller function from the plurality of storage controller function instances processed the command, the first abort tracking indicator identifying the selected function;
                aborting the command when the virtual function identifier matches the selected function;
            verify that no commands associated with the selected storage controller function remain pending at the apparatus; and
            clear registers associated with the selected storage controller function based on the verification that no commands remain in any of the plurality of queues associated with the selected storage controller function.

2. The apparatus of claim 1 further comprising:
    the circuit includes a data storage controller circuit configured to execute the plurality of storage controller function instances simultaneously, each storage controller function from the plurality of storage controller function instances configured to execute input/output (I/O) commands; and
    the circuit is configured to reset the selected storage controller function in response to the function reset indicator without interrupting operation of other storage controller functions from the plurality of storage controller function instances.

3. The apparatus of claim 2 further comprising:
    each storage controller function is configured to receive host input/output (I/O) commands from one or more command submission queues; and
    the circuit is further configured to abort each command associated with the selected storage controller function by deleting each command submission queue associated with the selected storage controller function.

4. The apparatus of claim 1, further comprising:
    the circuit further configured to:
        store a second abort tracking indicator to a receiving unit of the circuit, the receiving unit configured to receive commands from the host device, the second abort tracking indicator identifying the selected storage controller function; and
    the receiving unit configured to stop receiving commands for the selected storage controller function based on the second abort tracking indicator.

5. The apparatus of claim 4, further comprising:
    the circuit further configured to:
        store the first abort tracking indicator to the completion unit of the circuit;
    the completion unit configured to:
        receive the command that has been executed at the apparatus; and
        compare the virtual function identifier associated with the command to the first abort tracking indicator based on receiving the command.

6. The apparatus of claim 5, further comprising:
    aborting each command includes:
        identify commands associated with the selected storage controller function by comparing a function identifier of the selected storage controller function against virtual function identifiers of commands in a command table; and
        set an abort bit to "true" in the command table for each command associated with the selected storage controller function.

7. The apparatus of claim 6, further comprising:
a host interface to communicate with the host device external to the apparatus;
a nonvolatile memory;
the circuit includes a data storage controller configured to execute input/output (I/O) operations to the nonvolatile memory, the circuit including:
  a controller interface to communicate with the host interface;
  the receiving unit;
  the completion unit;
  a central processing unit (CPU) configured to:
    store the first abort tracking indicator to the receiving unit;
    store the second abort tracking indicator to the completion unit;
    verify that no commands associated with the selected storage controller function remain pending at the apparatus;
  an input/output (I/O) pipeline including a plurality of processing engines to execute commands, the processing engines configured to:
    receive a command for execution;
    determine whether the abort bit for the command is set to "true"; and
    abort execution of the command when the abort bit is set to "true".

8. The apparatus of claim 7, further comprising:
the completion unit and the processing engines further configured to generate an abort notification after aborting a command;
verifying that no commands associated with the selected storage controller function remain pending includes:
  maintain a command counter to indicate a number of commands associated with the selected storage controller function that remain pending at the apparatus;
  decrease the command counter for each abort notification; and
  determine that no commands associated with the selected storage controller function remain pending when the command counter reaches 0.

9. The apparatus of claim 8, the circuit further configured to:
maintain a separate command counter for each command queue from the plurality of queues associated with the selected storage controller function;
increase a selected command counter for a particular command queue from the plurality of command queues when a command is received at the receiving unit from the particular command queue; and
decrease the selected command counter for the particular command queue when an abort notification is generated for a command associated with the particular command queue.

10. An apparatus comprising:
a plurality of storage controller function instances, each storage controller function from the plurality of storage controller function instances having a plurality of queues for pending operations from a host device;
a storage controller circuit configured to:
  receive a function reset indicator from the host device, the function reset indicator identifying a selected storage controller function from the plurality of storage controller function instances on which to perform a function level reset (FLR) operation to reset the selected function;
  perform the FLR on the selected storage controller function based on the function reset indicator, including:
    abort all commands from each of the plurality of queues associated with the selected storage controller function and pending at the apparatus by:
      identifying commands associated with the selected storage controller function by comparing a function identifier of the selected storage controller function against virtual function identifiers of commands in a command table, the command table including data structures for each input/output (I/O) command pending at the apparatus;
      setting an abort bit to "true" in the command table for each command associated with the selected storage controller function; and
    reset registers associated with the selected storage controller function when no commands associated with the selected storage controller function remain, to reset the selected storage controller function to an initial state.

11. The apparatus of claim 10 further comprising:
the apparatus includes a nonvolatile solid state data storage device;
the storage controller circuit is configured to execute the plurality of storage controller function instances simultaneously, each storage controller function instance configured to receive input/output (I/O) commands from one or more command submission queues of the host device; and
the storage controller circuit is further configured to:
  abort each command associated with the selected storage controller function by deleting each of the plurality of queues associated with the selected storage controller function; and
  reset the selected storage controller function in response to the function reset indicator without interrupting operation of other storage controller function instances from the plurality of storage controller function instances.

12. The apparatus of claim 11, the storage controller circuit further configured to:
maintain a command counter for each of the plurality of queues associated with the selected storage controller function;
increase the command counter for a particular queue associated with the selected storage controller function when a command is received related to the queue; and
decrease the command counter for the particular queue when a command associated with the particular queue is aborted; and
determine that the particular queue is deleted when the command counter for the particular command submission queue is reduced to 0.

13. The apparatus of claim 10, further comprising:
the storage controller circuit includes:
  a receiving unit configured to receive commands from the host device;
  a completion unit configured to send command status indicators to the host device;
the circuit further configured to:
  store a first abort tracking indicator to a first register of the receiving unit, the first abort tracking indicator directing the receiving unit to stop receiving commands for the selected storage controller function;

store a second abort tracking indicator to a second register of the completion unit, the second abort tracking indicator directing the completion unit to:
receive a command that has been executed at the apparatus;
determine whether a virtual function identifier associated with the command corresponds to the selected storage controller function based on the second abort tracking indicator; and
abort the command when the virtual function identifier matches the selected storage controller function.

14. The apparatus of claim 10, further comprising:
an I/O pipeline including a plurality of processing engines to execute commands, the processing engines configured to:
receive a command for execution;
determine whether the abort bit for the command is set to "true" in the command table; and
abort execution of the command when the abort bit is set to "true".

15. The apparatus of claim 10, further comprising:
verifying that no commands associated with the selected storage controller function remain pending includes:
maintain a command counter to indicate a number of commands associated with the selected storage controller function that remain pending at the apparatus;
decrease the command counter as each command is aborted; and
determine that no commands associated with the selected storage controller function remain pending when the command counter reaches 0.

16. A method comprising:
executing, at a data storage device, a plurality of storage controller function instances, each storage controller function from the plurality of storage controller function instances having a plurality of queues for pending operations from a host device;
receiving a function level reset (FLR) indicator from the host device at a controller circuit of the data storage device, the FLR indicator identifying a selected function from the plurality of storage controller function instances to reset;
aborting each command from each of the plurality of queues associated with the selected function and pending at the data storage device based on the FLR indicator, including:
comparing a virtual function identifier associated with a command to a first abort tracking indicator stored to a completion unit of the controller circuit configured to send command status indicators to the host device, the virtual function identifier indicating which storage controller function from the plurality of storage controller functions processed the command, the first abort tracking indicator identifying the selected function;
aborting the command when the virtual function identifier matches the selected function; and
clearing stored values associated with the selected function when no commands associated with the selected function remain pending in any of the plurality of queues associated with the selected function.

17. The method of claim 16 further comprising:
storing a second abort tracking indicator to a register of a receiving unit of the controller circuit, the receiving unit configured to receive commands from the host device, the abort tracking indicator identifying the selected function; and
stopping receipt of commands for the selected function at the receiving unit based on the abort tracking indicator.

18. The method of claim 16 further comprising:
storing the first abort tracking indicator to the completion unit; and
receiving the command at the completion unit that has been executed at the controller circuit.

19. The method of claim 16 further comprising:
maintaining a command counter to indicate a number of commands associated with the selected function that remain pending at the data storage device;
identifying commands associated with the selected function by comparing a function identifier of the selected function against virtual function identifiers of commands in a command table;
setting an abort flag to "true" for each command associated with the selected function;
aborting commands having a "true" abort flag when the commands are received for processing at a processing engine of an input/output (I/O) processing pipeline;
decrementing the command counter when a command associated with the selected function is aborted; and
determining that no commands associated with the selected function remain pending at the data storage device when the command counter reaches 0.

* * * * *